Aug. 22, 1939.   A. J. ERICKSON   2,170,589
TREE AND PLANT PROTECTOR
Original Filed July 14, 1937
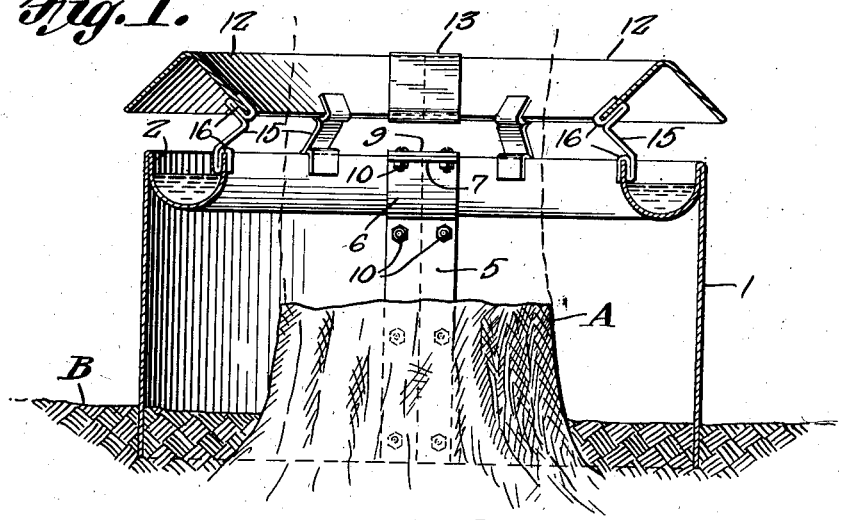
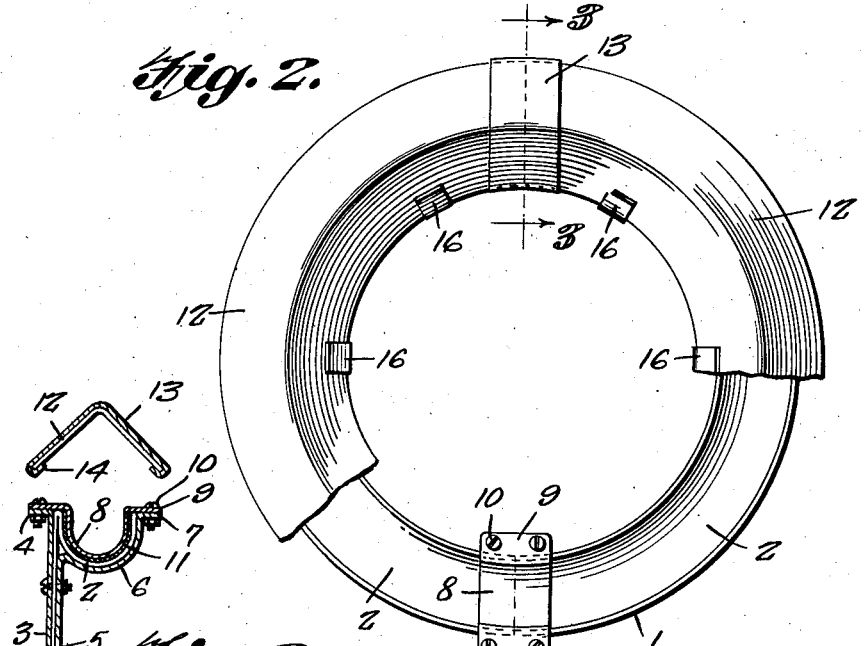
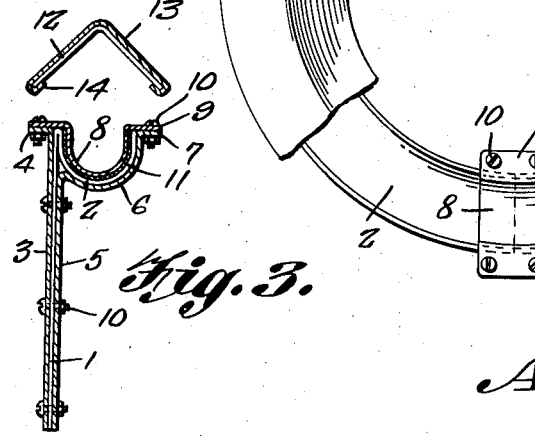
Andrew J. Erickson,
INVENTOR Patented Aug. 22, 1939

2,170,589

UNITED STATES PATENT OFFICE 2,170,589

TREE AND PLANT PROTECTOR

Andrew J. Erickson, Beebe, Wash.

Application July 14, 1937, Serial No. 153,641
Renewed February 21, 1939

3 Claims. (Cl. 47—23)

This invention relates to protectors for trees and plants, and its general object is to provide an improved protector primarily designed for use with trees and includes a trough to encircle a tree in spaced relation with respect to the trunk thereof so as to not only act as a barrier to prevent insects, worms and the like from gaining access to the trunk and crawling up the same, but the trough provides a trap and an insecticide receiving means, for the purpose of destroying the insects, etc.

A further object is to provide a protector that includes a hood or cover for the trough, and which prevents dirt, trash and other foreign matter from falling into the trough, as well as rain water and the like from diluting the insecticide therein.

Another object is to provide a protector that is supported from the ground adjacent to the trunk of the tree and is spaced a suitable distance therefrom so as to not interfere with the natural growth of the trunk or proper drainage for the tree.

A still further object is to provide a protector of the character set forth, that is simple in construction, inexpensive to manufacture, and extremely efficient in use and service.

This invention also consists in certain other features of construction and in the combination and arrangement of the several parts, to be hereinafter fully desecribed, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a vertical sectional view taken through the protector which forms the subject matter of the present invention and illustrates the same applied about the trunk of a tree.

Figure 2 is a fragmentary top plan view of the protector per se.

Figure 3 is a sectional view taken approximately on line 3—3 of Figure 2, looking in the direction of the arrows.

Referring to the drawing in detail the letter A indicates the trunk of a tree and B the ground or soil adjacent thereto, within which is embedded the lower portion of my protector for supporting the same with respect to the trunk as clearly shown in Figure 1.

The protector includes a pair of semi-circular sections held together in end to end association by splicing or clamping means which will be later described, and each section is made up of a single piece of material, such as sheet metal, preferably of the non-corrosive rust proof type, to provide a semi-circular vertical wall 1 having formed on the upper edge thereof an inwardly directed channel member 2 that is co-extensive with the length of the wall 1 and follows the shape of the upper edge thereof, as will be obvious upon inspection of Figure 2.

The splicing or clamping means for securing the sections together about the tree to provide a continuous vertical wall and a trough provided by the channel members 2, include outer strips 3 that are preferably co-extensive with the height of the walls 1 and each strip has an outwardly directed flange 4 formed on the upper end thereof and disposed at right angles with respect thereto. The strips 3 are for disposal on the outer sides of the walls 1, to bridge the meeting edges thereof, and cooperating with the strips 3 are inner strips 5 bent in rounded formation at the upper ends thereof to provide portions 6 following the shape of the trough, as shown in Figure 3, and the rounded portions are provided with flanges 7 extending inwardly from the upper ends thereof. Cooperating with the strips, and the rounded portions 6 of the inner strips 5, are inverted U-clamps 8 shaped to fit the inner surface of the trough and the clamps 8 have flanges 9 formed thereon which together with the flanges 4 and 7 and the body portions of the strips 3 and 5 have openings therein to receive bolt and nut connections 10 for securing the strips and U-clamps in position for use upon opposite sides of the meeting edges of the vertical walls 1 and channel members 2, it being obvious that the walls 1 are provided with openings to receive the bolts of the bolt and nut connections.

From the foregoing and as clearly shown in Figure 1, it will be apparent that the sections are disposed about the tree trunk, and then are clamped together. When the sections are disposed in clamped association, the lower portion of the continuous vertical wall is then embedded in the ground to secure the protector against accidental movement or displacement, and in a manner whereby the trough is spaced an equal distance about the trunk.

The trough not only provides a barrier to prevent insects and the like from gaining access to the trunk, but is also adapted to receive insecticide or other suitable destroying agent, and in order to prevent liquid insecticide from leaking between the meeting edges of the channel members 2, I provide gaskets 11 between the U-clamps 8 and the meeting edges, as clearly shown in Figure 3.

I provide a hood or cover for the trough, and which likewise includes semi-circular sections 12, that are shown as being of inverted V-form in cross section. The sections 12 are likewise made from sheet metal and are detachably secured together in end to end contact by clamps 13 having flanges 14 on the outer ends thereof, for cooperation with the body portions of the clamps to frictionally receive the ends of the sections 12, as shown.

The hood or cover is elevated above the trough, by supporting brackets 15 which are bent to provide pairs of clamping tongues 16 at the ends thereof for receiving the inner edge portions of the trough and hood for supporting the latter, as clearly shown in Figure 1. The brackets 15 are likewise made from sheet metal and the intermediate portions thereof are disposed at an inward angle, so that the hood will be centered with respect to the trough, and the hood is of sufficient width to extend in a plane beyond the trough in order to prevent dirt, trash and foreign matter from falling into the trough, as well as rain water and the like from diluting the insecticide therein.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A tree protector comprising a pair of semi-circular companion sections including vertical walls adapted to have their lower portions embedded in the ground for supporting the protector in position for use, channel members included in the sections and formed on the upper edges thereof and being inwardly directed therefrom, splicing means for the sections and detachably securing them together in edge to edge contact in tree encircling formation, said splicing means including inner and outer strips bridging the meeting edges of the walls, means included in the splicing means and cooperating with the upper ends of the inner strips for securing the channel members together in trough formation, and means to provide a leak proof connection between the channel members.

2. A tree protector comprising a pair of semi-circular companion sections including vertical walls adapted to have their lower portions embedded in the ground for supporting the protector in position for use, channel members included in the sections and formed on the upper edges thereof and being inwardly directed therefrom, splicing means for the sections and detachably securing them together in edge to edge contact in tree encircling formation, said splicing means including inner and outer strips bridging the meeting edges of the walls, means included in the splicing means and cooperating with the upper ends of the inner strips for securing the channel members together in trough formation, means to provide a leak proof connection between the channel members, a sectional hood for the trough, splicing means for the hood sections and detachably receiving the same, and supporting brackets for the hood and including pairs of clamping tongues at the ends thereof for detachably receiving the hood and trough.

3. A tree protector comprising companion sections including vertical walls adapted to be embedded in the ground for supporting the protector in position for use, channel members included in the sections, splicing means for the sections and detachably securing them together in edge to edge contact in tree encircling formation, said splicing means including inner and outer strips bridging the meeting edges of the walls, U-clamps extending into the channel members and the inner strips including rounded portions underlying the channel members, said U-clamps being secured to the inner and outer strips and cooperating with the rounded portions for securing the channel members together in continuous trough formation, and means to provide a leak proof connection between the channel members.

ANDREW J. ERICKSON.